Oct. 23, 1934.  O. M. OTTE  1,978,219
METHOD OF TREATING METALLIC MATERIALS
Filed Aug. 31, 1932
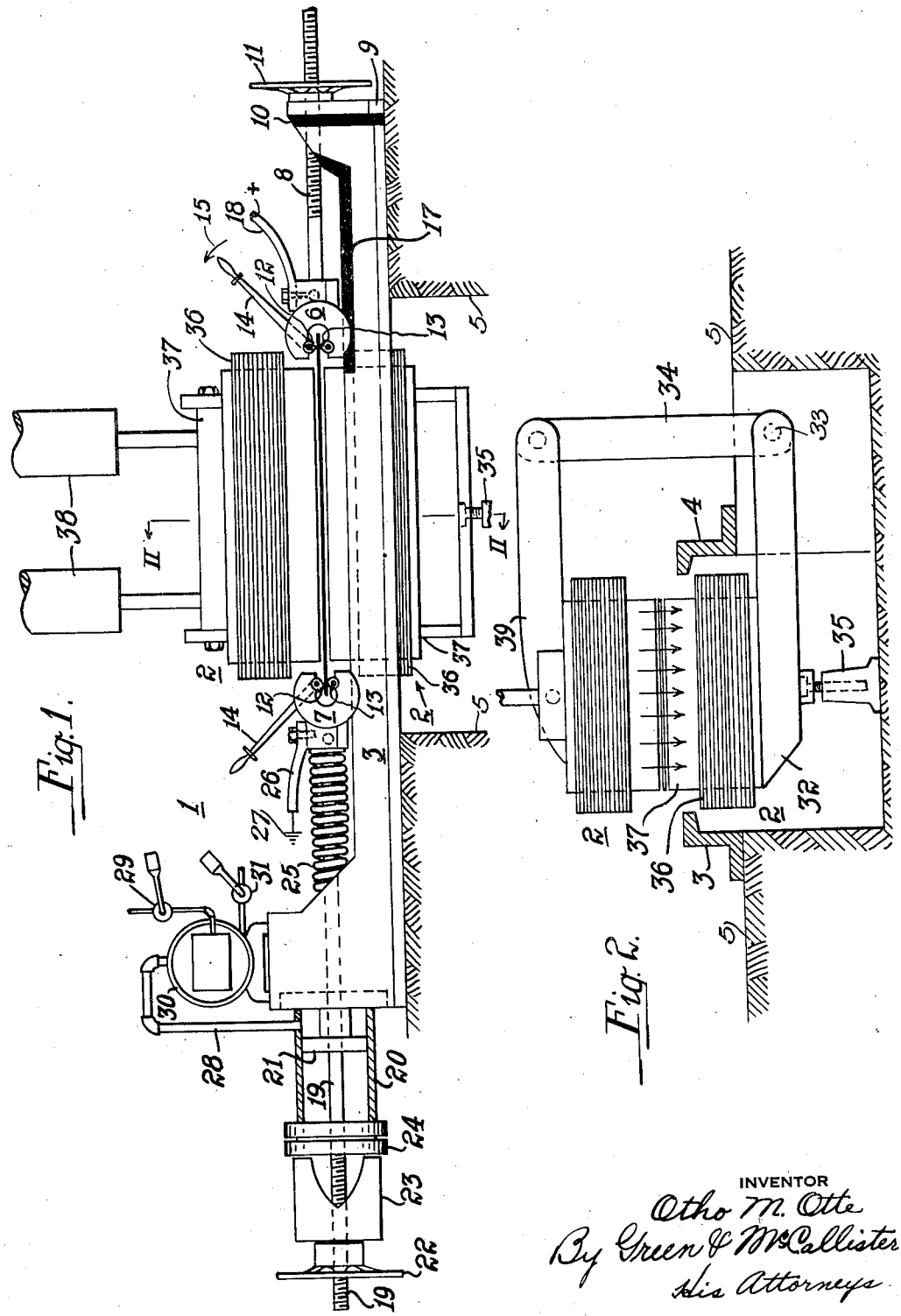
INVENTOR
Otho M. Otte
By Green & McCallister
his Attorneys Patented Oct. 23, 1934

1,978,219

UNITED STATES PATENT OFFICE

1,978,219
METHOD OF TREATING METALLIC MATERIALS

Otho M. Otte, Tarentum, Pa., assignor, by direct and mesne assignments, to Allegheny Steel Company, Brackenridge, Pa., a corporation of Pennsylvania Application August 31, 1932, Serial No. 631,198

15 Claims. (Cl. 175—21)

This invention relates generally to a method of improving the physical and/or magnetic properties of metallic materials and more particularly to the improvement of electrical sheets in respect to such properties.

All metallic materials, particularly those included in the paramagnetic group, with which I am familiar, undergo fundamental changes in physical and paramagnetic properties under certain conditions of treatment. It has been observed that such changes take place as the result of either mechanical working or heat treatment, or the combination of working and heat treatment.

Magnetic materials, such as electrical sheets, for example, when heated to a temperature well above the range including the recalescent and decalescent points, and allowed to cool to temperatures within or below this range, undergo marked changes, and it is my belief that such changes occur because of the peculiar rearrangement of the molecular structure of the sheets. Such changes are usually referred to as molecular rearrangement.

Fundamental changes occur also, in electrical sheets, and other magnetic materials, when subjected to mechanical stresses of sufficient intensity to either exceed the yield point or the ultimate strength thereof. Certain electrical sheets, such as those of the silicon steel class, are even more sensitive to mechanical stresses in that light stresses often produce or occasion marked variations in the magnetic properties thereof. Mechanical stresses imposed on silicon steel sheets usually result in an impairment of its permeability.

As the result of experiments which I have performed, in regard to the mechanical working of electrical sheets, I have drawn the conclusion, and it is my belief, that magnetic materials, and particularly electrical sheets, undergo far more fundamental changes in the molecular structure as the result of the combined forces of heat and pressure, than when subjected to only one or the other of these forces.

Electrical sheets as produced by hot rolling, are not uniform in respect to physical or magnetic properties and particularly in regard to permeability and watt loss per unit weight, as per pound. Sheets produced by the same process and rolling technique, and so far as is perceptible, under the same conditions will vary considerably in the magnetic properties mentioned and further, it is very common to find considerable variations in different portions or areas of the same sheet.

Since such sheets are designed for use in magnetic circuits, in the makeup of laminated cores, for example, it is highly desirable, and often imperative, that each lamination shall have substantially the same magnetic properties in respect to permeability and watt loss occasion by the magnetizing forces of the circuit.

In order to obtain such uniformity, it has been the practice heretofore, to test individual lifts (group of sheets) for watt loss and permeability and to select only those lifts having substantially identical predetermined properties, those which depart from these standards of quality in the properties mentioned, being reclassified as lower grade. Such methods and procedure of obtaining electric sheets of uniform quality have therefore been expensive in that much of the material produced, has been of inferior quality.

An object of this invention is the provision of a method of treating magnetic materials whereby the physical and/or magnetic properties may be beneficially altered.

Another object of the invention is the provision of a method of treating metallic materials, particularly magnetic or electrical sheets, so that sheets of substantially the same metallurgical composition, produced under substantially identical conditions, may be improved and/or made uniform in respect to their magnetic properties. Under such a method the heretofore wasted sheets may be reclaimed by improving their magnetic properties and making them substantially equal in quality, to sheets having the desired qualities.

It is also an object of the invention to provide a method of treating magnetic materials and particularly electrical sheets, whereby sheets of uniform quality in respect to their magnetic properties may be improved, and sheets of inferior quality, in these properties, may be improved and reclaimed.

While the invention may be particularly useful in cases included within the above objective statements, it is to be understood that other forms of paramagnetic materials, as well as diamagnetic metallic materials, may be treated in accordance with the invention, to improve either the physical or the magnetic properties thereof, or both.

Generally stated, these properties may be improved or changed by stressing the material, either in tension or compression, sufficiently to produce deformation and while so stressing the material, subjecting it to the action of magnetizing forces, as for example, by placing the material in a magnetic field, or to the action of electric current, or both. The intensity of the magnetizing forces, or the magnetic field or current may be varied to suit particular materials.

In treating certain materials which are weak in tension, such as electrical sheets of silicon steel, it is proposed to heat such materials to a temperature at which they may be stretched without exceeding the ultimate strength thereof, and while at such temperature and under stress, to subject the materials to the action of a magnetic field, or electric current, or both, the intensity of either of which may be adjusted to produce the beneficial results desired. Where electrical silicon steel sheets are treated in accordance with this method, it is preferred, in the light of present knowledge and experience, to heat them to a temperature well above the range of temperature in which molecular rearrangement is most active, and it is my belief that molecular rearrangement takes place most actively between the temperature range defined by the decalescence and recalescence points. These points of course vary with materials of different metallurgical composition.

After stressing the material to the point at which deformation occurs, or to a point at which the material takes a permanent set, the sheets may be annealed, if necessary, to further improve either the physical and/or magnetic properties thereof. Where other materials are treated, particularly those in which the yield point and the ultimate strength are widely separated so that the materials may be stretched beyond the yield point without exceeding the ultimate strength, the physical and/or magnetic properties thereof may be beneficially altered by subjecting such materials to the action of a magnetic field, or current or both, while under stress.

The magnetic field or magnetizing forces herein referred to are intended to include aperiodic and periodic forces and fields, and in the treatment of metallic materials in accordance with this invention, it will be understood that the particular type of field to be employed should be the type which will produce or result in the most beneficial treatment.

In order that an understanding may be had as to how the method of the invention may be carried out, reference should be made to the following description taken in conjunction with the accompanying drawing in which:

Figure 1 is a more or less diagrammatic view in side elevation of a machine embodying a stretching mechanism provided with electromagnets and means for passing current through material, whereby materials, such as electrical sheets, may be given treatment in accordance with the method embodying the invention; and Fig. 2 is a view in section through the frame of the machine taken on lines II—II of Fig. 1, the electromagnets being shown in full lines.

In the drawing and the accompanying description, like reference characters indicate like parts.

In Fig. 1 a machine 1 commonly referred to in the art as a stretcher-leveller, is shown, the machine being provided with electromagnets 2 adapted to magnetize sheets, strips or other material while under the tensile stresses imposed thereon by the machine. The particular machine herein illustrated is adapted to place sheets, strips or other material under tension, the intensity of which may be varied. With such a machine the material operated upon may be strained to or above the yield point if desired, or until the sheet or strip is level.

Machine 1 is more or less diagrammatically illustrated and comprises frame members 3 and 4 adapted to be mounted on a suitable foundation 5, and material-gripping members 6 and 7. Member 6 is mounted at the end of a screw 8 that extends through an end plate 9 secured to the side frame at the right-hand ends thereof, and insulated therefrom with insulation 10, as seen in Fig. 1. The end of the screw projecting beyond the end plate carries a handwheel 11 having screw thread engagement therewith. By turning the handwheel, gripping member 6 may be positioned in any desired location.

Member 6 carries a pair of gripping jaws 12 and 13 which, as tension is applied to material held thereby, automatically grips the material with increasing force as the force or loading applied to the material is increased. To disengage jaws 12 and 13 from material held therebetween, a lever 14 connected to jaw 12 is turned in the direction of arrow 15. After material is placed therebetween the jaws are returned to gripping position by turning lever 14 in the opposite direction.

Gripping member 6 is insulated from frame members 3 and 4 by means of spacers 17, of insulating material, mounted on the upper edges thereof, as shown in Fig. 1. Thus, an electric cable 18 may be connected to member 6 and be insulated from the frame of the machine.

Gripping member 7 is mounted at the end of a rod 19 that extends through a cylinder 20 mounted on the frame members 3 and 4 at the left-hand ends thereof, as seen in Fig. 1. The rod also extends through a piston 21 working in the cylinder, the piston being attached to the rod. The rod has screw-thread engagement with a handwheel 22 adapted to bear against a housing 23 secured to the cylinder head 24. A strong compression spring 25 is disposed about rod 19 between gripping member 7 and cylinder 20. This spring urges the piston toward the right-hand end of the cylinder. By adjusting handwheel 22, the initial tension imposed on spring 25 and the position of gripping member 7 may be varied.

Gripping member 7 is substantially the same in construction as gripping member 6 and includes gripping jaws 12 and 13 such as shown in member 6 and an operating lever 14 adapted to actuate the jaws to or from gripping position. Gripping member 7 has a cable 26 attached thereto which is grounded at 27 so that a sheet, strip, or other material, gripped by members 6 and 7 may be connected in circuit with a source of electric current through cables 18 and 26.

After a sheet or strip, or other material has been placed in the jaws of gripping members 6 and 7, and clamped therein, a medium such as compressed air, is admitted to cylinder 20 through a pipe 28, which causes the piston to move to the left and place the sheet or material under tension. As the pressure is increased, the loading on the sheet or material increases. When a predetermined load is imposed on the sheet, such load may be held constant for a predetermined length of time, or the loading may be increased until a predetermined elongation occurs in the material.

The pressure medium may be derived from any source and is controlled by a valve 29. A ballast or surge tank 30 may be interposed between valve 29 and pipe 28. When the stressing operation is completed, the medium may be exhausted from cylinder 20 through an exhaust valve 31. As the pressure is reduced, spring 25 returns the piston to no-load position.

While the material is under stress it may be subjected to the magnetic field or the magnetizing force developed by the electromagnets 2. These magnets as shown, are disposed above and below, respectively, the material or sheet undergoing treatment.

The lower magnet is mounted on a base 32 which may be hinged as at 33 on a column 34. This magnet may be raised or lowered by means of a jack or screw 35 and locked in any desired position.

Electromagnets 2 each comprises solenoid or magnetizing winding 36 and a core 37 about which its winding is wound. Windings 36 may be energized either with alternating or direct current, depending upon which is best suited for the treatment of the particular material under consideration.

Windings 36 of the electromagnets may be connected in parallel if energized with alternating current, or either in series or parallel if energized with direct current.

The upper magnet is suspended from a pair of lifts 38 for raising and lowering the same, the magnet being raised to permit the insertion of or withdrawal of material from the airgap between the magnets. The upper magnet is connected by links 39 to column 34 which acts as a guide therefor.

While the material is under stress imposed thereon by machine 1, the windings of the electromagnets 2 are energized with electric current. The magnetic field developed thereby passes through the material which, as shown in the drawing, is disposed in the airgap between the magnets. With the magnets arranged, as shown, the lines of force permeate the sheet in a direction normal thereto and to the line or direction of mechanical stress.

The combined action of heat, stress and magnetization results in what appears to be uniform molecular rearrangement or in the occurrence of fundamental changes which improve the physical and/or magnetic properties of the material. It appears also that such action tends to accentuate these fundamental changes and to cause such arrangement of the crystals of the material that their magnetic axes are parallel and polarized in such manner as is conducive to improved physical and/or magnetic properties.

These fundamental changes may be accentuated and made more uniform by passing electric current through the material, while under stress in the machine, in the direction of crystal elongation. To this end, the cables 18 and 26 are provided. It is proposed to connect these cables to a source of low voltage electric power adapted to supply current of high amperage or density. Where high current densities are utilized, it will be appreciated that the gripping jaws 12 and 13 should be designed for adequate current conducting capacity.

The action of the current appears to result in efficient alinement and arrangement of the crystallin structure of the material. This action, of course, is accentuated by the force of heat and/or stress.

In some cases, the sheet or material under stress may be subjected to the combined action of current and magnetizing forces that is, the current may be passed through the sheet or material at the same time that the material is subjected to the magnetizing forces of the electromagnets.

It will be understood by those skilled in this particular art that the field strength or the intensity of the magnetizing forces and/or the current to which the material is subjected while under stress by machine 1 may be varied while the treatment is under progress or may be held constant. It will also be appreciated that where direct current is utilized for energizing the magnetizing windings, such current may be reversed during some portion of the process or throughout the entire treatment of the materials. Likewise the current passing through the material may be varied and/or reversed as the treatment requires.

The particular manner of controlling the intensity of the magnetizing forces to which the material is subjected, and in determining whether periodic or aperiodic magnetizing currents shall be used for energizing these windings, will depend upon the particular materials under consideration and the nature thereof.

Before a sheet is placed in the jaws and subjected to the magnetizing forces of the electromagnets and/or the action of current while under stress, the material may be heated up to a temperature well above the temperature range at which or in which molecular rearrangement occurs. The material is then placed in the gripping jaws of the machine and a stressing load applied as above described. The material, as it cools, and while under stress, will be subjected either to the magnetizing effect of the electromagnets, the effect of current, or both. The length of time during which the material is under stress and subjected to the magnetizing forces of the electromagnets and/or the action of current may depend upon the properties desired and the particular material under treatment.

In case certain alloy steel electrical sheets are under treatment it may be necessary to heat such sheets to high temperatures in order that they may be stretched to beyond the yield point without reaching the ultimate strength thereof. In the treatment of other materials in which the yield point and the ultimate strength are widely separated, it may not be necessary to preheat the same, or in case preheating is beneficial, the temperature of preheating may be lower than for the materials above mentioned.

Some materials may be beneficially treated without heating before stressing the same and magnetizing while under stress. Other materials which may not be capable, because of their physical properties, of being stressed to that point at which the material will be beneficially improved by the combined action of magnetic, electric, and mechanical forces, may require preheating to temperatures slightly below the recalescent point, or higher, as between the recalescent point and the decalescent point, or to a temperature above this range, and then allowed to cool while under stress and subjected to magnetizing and/or electric current forces, such as described herein.

Having thus described the invention, it will be appreciated by those skilled in this particular art that the method and the apparatus for putting the method into effect, may be varied and modified without departing either from the spirit or the scope of the invention.

It is therefore desired that only such limitations shall be placed on the invention as are imposed by the prior art and the appended claims.

What I claim as new and desire to secure by Letters Patent is:

1. The method of improving the physical and/or magnetic properties of metallic materials that comprises mechanically stressing the material, and passing electric current through the material while under stress.

2. The method of improving the physical and/or magnetic properties of metallic materials that comprises mechanically stressing the material, and while so stressing the material passing electric current through the material in the direction of stress.

3. The method of improving the physical and/or magnetic properties of metallic materials that comprises mechanically stressing the material, and while so stressing the material passing electric current through the material and subjecting the material to the action of a magnetic field.

4. The method of improving the physical and/or magnetic properties of metallic materials that comprises heating the material to a temperature such that the material will take a predetermined amount of elongation, stressing the material to produce elongation, and while so stressing the material, passing electric current through the same in the direction of elongation.

5. The method of improving the physical and/or magnetic properties of metallic materials that comprises heating the material to a temperature such that the material will take a predetermined amount of elongation, stressing the material to produce elongation, while so stressing the material, passing electric current through the same in the direction of elongation, and subjecting the material to the action of a magnetic field.

6. The method of improving the physical and/or magnetic properties of metallic materials that comprises heating the material to a temperature such that the material will take a predetermined amount of elongation, stressing the material to produce elongation, while so stressing the material, passing electric current through the same in the direction of elongation, interrupting the current flow and then subjecting the material to the action of a magnetic field.

7. The method of improving the physical and/or magnetic properties of metallic materials that comprises heating the material to a temperature such that the material will take a predetermined amount of elongation, stressing the material in tension, and while so stressing the material simultaneously passing electric current through the material and subjecting the same to magnetizing forces sufficient to permeate the same and beneficially influence the occurrence of fundamental changes therein such as may be beneficial to the physical and/or magnetic properties thereof.

8. The method of improving the physical and/or magnetic properties of paramagnetic materials that comprises heating the material to a temperature within the range defined by the decalescent and recalescent points of the material, mechanically stressing the material while within said temperature range to produce a permanent set therein, magnetizing the material in a direction normal to the direction of stress, and passing electric current through the material in the direction of mechanical stress.

9. The method of improving the physical and/or magnetic properties of paramagnetic materials that comprises heating the material to a temperature within the range defined by the decalescent and recalescent points of the material, mechanically stressing the material while within said temperature range to produce a permanent set therein, magnetizing the material in a direction normal to the direction of stress, passing electric current through the material in the direction of mechanical stress, and allowing the material to cool while being so stressed and magnetized.

10. The method of improving the physical and/or magnetic properties of paramagnetic materials that comprises heating the material to a temperature within the range defined by the decalescent and recalescent points of the material, mechanically stressing the material while within said temperature range to produce a permanent set therein, passing electric current through the material in the direction of mechanical stress, and then in annealing the material after such treatment.

11. The method of improving the physical and/or magnetic properties of paramagnetic materials that comprises heating the material to a temperature within the range defined by the decalescent and recalescent points of the material, mechanically stressing the material while within said temperature range to produce a permanent set therein, passing electric current through the material in the direction of mechanical stress, and then in annealing the material after such treatment, magnetizing the material in a direction normal to the direction of stress, and then in annealing the material after such treatment.

12. The method of producing electrical sheets each having substantially the same watt loss, per unit of weight, resulting from varying and/or periodic magnetizing forces, that comprises hot rolling a starting piece through the usual number of reducing and finishing passes, cutting the rolled material into strips or sheets, testing said sheets for watt loss, segregating the sheets having a watt loss exceeding a predetermined value from the sheets having the desired watt loss value, placing the first mentioned sheets in a magnetic field and stressing the same to produce permanent deformation while in said field.

13. The method of producing electrical sheets each having substantially the same watt loss, per unit of weight, resulting from varying and/or periodic magnetizing forces, that comprises hot rolling a starting piece through the usual number of reducing and finishing passes, cutting the rolled material into strips or sheets, annealing the sheets, placing the sheets in a magnetic field and stressing to the point of producing a permanent set therein while in said field.

14. The method of producing electrical sheets each having substantially the same watt loss, per unit of weight, resulting from varying and/or periodic magnetizing forces, that comprises hot rolling a starting piece through the usual number of reducing and finishing passes, cutting the rolled material into strips or sheets, annealing the sheets, placing said sheets singly in a magnetic field to magnetize the same, and stressing the sheet sufficiently to produce deformation while in said field.

15. The method of improving the physical and/or magnetic properties of metallic materials that comprises heating the material, stressing the heated material to produce elongation, and while so stressing the material, passing electric current through the same in the direction of elongation.

OTHO M. OTTE.